(12) United States Patent  
Leslie

(10) Patent No.: US 8,336,897 B2
(45) Date of Patent: Dec. 25, 2012

(54) PHASE INDEPENDENT ROW MOTION PROPELLED BICYCLE

(76) Inventor: Juliana Leslie, Newport Beach, CA (US)

( * ) Notice: Subject to any disclaimer, the term of this patent is extended or adjusted under 35 U.S.C. 154(b) by 0 days.

(21) Appl. No.: 13/104,022

(22) Filed: May 10, 2011

(65) Prior Publication Data

US 2011/0248466 A1 Oct. 13, 2011

Related U.S. Application Data

(63) Continuation-in-part of application No. 12/197,262, filed on Aug. 24, 2008, now Pat. No. 7,938,419.

(60) Provisional application No. 60/969,795, filed on Sep. 4, 2007.

(51) Int. Cl.
*B62M 1/14* (2006.01)
*B62M 1/16* (2006.01)

(52) U.S. Cl. .................. 280/244; 280/225; 280/242.1; 280/245; 280/253; 280/254

(58) Field of Classification Search .............. 280/210, 280/225, 242.1, 243, 244, 246, 247, 248, 280/251, 252, 253, 254, 255, 256, 257, 258, 280/224, 233, 245
See application file for complete search history.

(56) References Cited

U.S. PATENT DOCUMENTS

| | | | | |
|---|---|---|---|---|
| 1,327,960 A * | 1/1920 | Moody | .......... | 280/265 |
| 2,085,657 A * | 6/1937 | Heisdorf | .......... | 280/245 |
| 2,464,952 A * | 3/1949 | Warburton | .......... | 280/225 |
| 4,147,370 A * | 4/1979 | Lindsey, Jr. | .......... | 280/234 |
| 4,305,600 A * | 12/1981 | Mendez | .......... | 280/240 |
| 4,700,962 A * | 10/1987 | Salmon | .......... | 280/220 |
| 4,886,287 A * | 12/1989 | Krause et al. | .......... | 280/246 |
| 4,925,200 A * | 5/1990 | Jones | .......... | 280/233 |
| 4,941,673 A * | 7/1990 | Bennett | .......... | 280/242.1 |
| 5,272,928 A * | 12/1993 | Young | .......... | 74/137 |
| 5,280,936 A * | 1/1994 | Schmidlin | .......... | 280/234 |
| 5,282,640 A * | 2/1994 | Lindsey | .......... | 280/234 |
| 5,330,218 A * | 7/1994 | Escudero | .......... | 280/245 |
| 5,536,029 A * | 7/1996 | Gramckow | .......... | 280/263 |
| 5,876,052 A * | 3/1999 | Olson et al. | .......... | 280/244 |
| 6,352,274 B1 * | 3/2002 | Redman | .......... | 280/248 |
| 6,572,129 B1 * | 6/2003 | Bean | .......... | 280/234 |
| 6,585,277 B1 * | 7/2003 | Monteagudo | .......... | 280/244 |
| 7,140,626 B1 * | 11/2006 | Keay | .......... | 280/230 |
| 7,237,786 B2 * | 7/2007 | Montez | .......... | 280/240 |
| 7,753,386 B2 * | 7/2010 | Drymalski | .......... | 280/243 |
| 2005/0035569 A1 * | 2/2005 | Ikeda et al. | .......... | 280/244 |

* cited by examiner

*Primary Examiner* — Tashiana Adams
*Assistant Examiner* — Marc A Scharich
(74) *Attorney, Agent, or Firm* — Kafantaris Law Offices; Theo Kafantaris

(57) ABSTRACT

A standard-sized bicycle includes a main frame, a rear drive wheel and a rowing mechanism. The rowing mechanism is coupled to the steering column about a fulcrum. The fulcrum allows the rowing mechanism to oscillate forward in response to a pushing force and backward in response to a pulling force. The rowing mechanism includes a power lever and a pair of drive levers. The power lever has a handle on one end. The power lever also has a second end. The pair of drive levers extend from the second end of the power lever and provide foot rests for additional force. Each of the pair of drive levers is in mechanical communication with the rear drive wheel such that a forward oscillation of the rowing mechanism will drive the rear drive wheel in a same direction of rotation to propel the bicycle forward.

6 Claims, 18 Drawing Sheets

US 8,336,897 B2

PHASE INDEPENDENT ROW MOTION PROPELLED BICYCLE

CROSS-REFERENCE TO RELATED APPLICATIONS

The present application is a continuation-in-part of and claims priority to U.S. patent application Ser. No. 12/197,262, filed on Aug. 24, 2008, which claims priority to U.S. Provisional Patent Application No. 60/969,795, filed on Sep. 4, 2007, both incorporated herein by reference.

STATEMENT REGARDING FEDERALLY SPONSORED RESEARCH AND DEVELOPMENT

Not Applicable.

FIELD OF THE INVENTION

This invention relates generally to bicycles that can be used for leisure or exercise purposes, and more particularly, to bicycles that are propelled using a rowing motion with the upper body rather than by a pedaling motion with the legs.

DISCUSSION OF RELATED ART

The following description provides a summary of information relevant to the present invention. It is not an admission that any of the information provided herein is prior art to the presently claimed invention, nor that any of the publications specifically or implicitly referenced are prior art to that invention.

Rowing has long been known as one of the most efficient methods of exercising one's body. It provides an excellent cardiovascular workout without the resulting damage to joints and bones caused by running In addition, it is a natural way to build both upper and lower body strength as well as an effective abdominal exercise. For that reason, rowing machines have been a mainstay in health clubs and gymnasiums for decades.

Unfortunately, relatively few people have the opportunity or time to take advantage of the benefits of rowing. First, few people have row boats or access to bodies of water that would be conducive to rowing. Second, rowing on a rowing machine in a health club or in one's home can be boring for many. Much of the excitement and fun of riding outdoors on a bicycle are lost when exercising indoors on machines.

Attempts have been made to address these problems with bicycles designed for outdoor use that attempt to recreate a rowing notion. One example is the Rowbike™ (www.rowbike.com), which uses a pseudo or modified rowing motion to propel the bicycle. The modified rowing motion involves resistance on the backward rowing motion, but no resistance at all on the forward rowing motion. Thus, it does not recreate the stresses and strains on all of the muscles and muscle groups stimulated by the traditional rowing motion.

There are other outdoor bicycles that are sold, which also use a modified rowing technique for propulsion, but Applicant is aware of none that provide all of the benefits of the traditional rowing motion. For example, none of these bicycles provide the quality of exercise to the chest muscles and triceps that one can get from traditional rowing. In addition, most of these bicycles are much longer than a typical road bicycle and are clumsy and more difficult to use and steer than a normal bicycle. In addition, none can accelerate and maintain the speeds that a normal pedaling bicycle can achieve.

Therefore, there is a need for a recreational device that can be used outdoors and that can provide a quality workout to the user by implementing a traditional rowing motion. The present invention accomplishes these objectives.

SUMMARY OF THE INVENTION

For purposes of this disclosure, standard-sized bicycle shall mean the following: a bicycle having a frame with a length and height that is within bicycle industry standards for standard road and off-road bicycles for each age group of riders. The meaning of "standard-sized bicycle" shall include extended or reduced lengths and heights to accommodate taller or shorter riders. Thus, standard-sized bicycle shall correspond to different dimensions for bicycles made for different age groups and riders of different heights. By way of example, each of the following are examples of standard-sized bicycles: adult road bike, adult off-road bike, child road bike, child off-road bike, tall adult road bike, tall adult off-road bike, short adult road bike, and short adult off-road bike. The meaning of "standard-sized bicycle" shall not include a bicycle that has a frame significantly lengthened or heightened for purposes other than to accommodate taller or shorter riders.

The present device is a standard-sized bicycle that can be used outdoors to provide the user with an enjoyable experience while still providing quality exercise. The present invention includes a main frame, a drive wheel and a rowing mechanism. The rowing mechanism is coupled to the main frame about a fulcrum. The fulcrum allows the rowing mechanism to oscillate forward in response to a pushing force and backward in response to a pulling force. The rowing mechanism includes a power lever and a pair of drive levers. The power lever has a handle on one end. The power lever also has a second end. The pair of drive levers extends from the second end of the power lever. Each of said pair of drive levers is in mechanical communication with the drive wheel such that both a forward oscillation of the rowing mechanism and a backward oscillation of the rowing mechanism drive the drive wheel in the same direction of rotation.

In accordance with another embodiment, a bicycle propulsion system is disclosed. The bicycle propulsion system includes a rowing mechanism, a first driver and a second driver. The rowing mechanism includes a power lever, a pull-motion lever, and a push-motion lever. The power lever has a first end and a second end, and the first end has a handle. The pull-motion lever extends in a forward direction from the second end of the power lever. The pull-motion lever is at an angle a relative to the power lever. The pull-motion lever also has a distal end. The push-motion lever extends in a backward direction from the second end of the power lever. The push-motion lever is at an angle relative to the power lever. The push-motion lever also has a distal end. The first driver has a first conveyor trained around it, which is connected at one end to the distal end of the pull-motion lever. A first one-way clutch engages the first driver to a main drive driver. The second driver has a second conveyor trained around it, which is connected at one end to the distal end of the push-motion lever. A second one-way clutch engages the second driver to the main driver. Both a forward motion and a backward motion of the rowing mechanism are capable of propelling a drive wheel of a bicycle in the same direction of rotation.

In accordance with yet another embodiment, a standard-sized bicycle includes a main frame, a drive wheel and a rowing mechanism. The rowing mechanism is coupled to the main frame about a fulcrum. The fulcrum allows the rowing mechanism to oscillate forward in response to a pushing force and backward in response to a pulling force. The rowing mechanism includes a power lever and a pair of drive levers. The power lever has a handle on one end. The power lever also has a second end forming a pair of drive levers. Each of said pair of drive levers is in mechanical communication with the drive wheel such that both a forward oscillation of the rowing mechanism and a backward oscillation of the rowing mechanism drive the drive wheel in the same direction of rotation.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed

DESCRIPTION OF THE DRAWINGS

Embodiments of this invention may best be understood by referring to the following description and accompanying drawings that are used to illustrate the invention. In the drawings.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The bicycles and bicycle propulsion systems described herein are directed to propulsion affected by a modified rowing type motion. Unlike other bicycles or bicycle propulsion systems, however, the present disclosure provides bicycles and bicycle propulsion systems in which both the pulling phase and pushing phase of the rowing type motion propel the bicycle forward. In the pulling phase, the motion is very similar to rowing, and in the pushing phase, the motion is similar to a bench-pressing motion. In addition, unlike previous row-type bicycles, the present disclosure provides row-type bicycles that are of standard size rather than being lengthened to accommodate a rowing mechanism. It is the unique rowing mechanisms described herein that permit the design of standard-sized bicycles.

Figure 1:
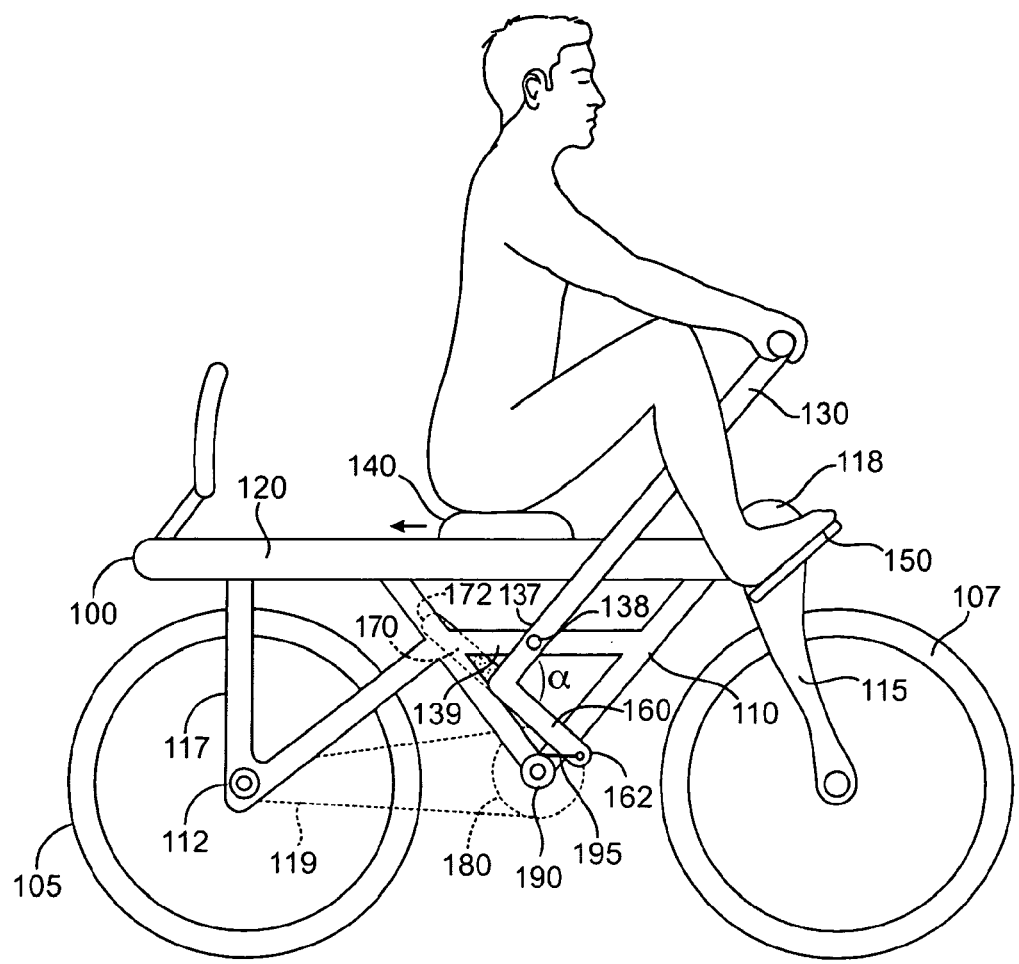
FIG. 1 is a side view of a bicycle in accordance with one embodiment, in which the rider is at the beginning of a pull phase.

Turning now to FIG. 1, a bicycle 100 in accordance with one embodiment depicts a rider at the beginning of a pull phase. The bicycle 100 is approximately the same size as a typical mountain bike with 26" wheels. The rider is approximately six feet tall. The bicycle 100 has a mainframe 110 that supports a glide bar 120. The rear fork 117 is formed integrally with or coupled to the main frame 110 of the bicycle. The rear wheel 105 is attached to the rear fork 117. The rear wheel 105 is the drive wheel and is attached to the rear fork 117 in any number of ways that are well known to those of skill in the art. For example, the hub of the drive wheel can be supplied with the usual sprocket 112, so that the drive wheel 105 is a free wheel. That is, the sprocket 112 can have a one-way clutch as is customary in bicycles.

Figure 2:
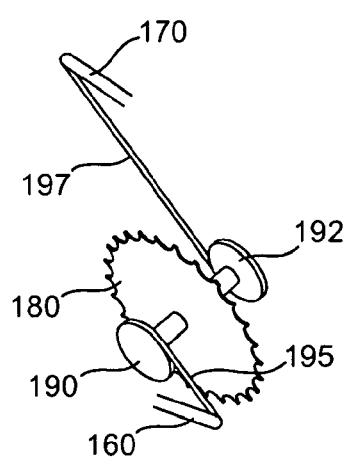
FIG. 2 is a top perspective view of a reel mechanism in accordance with one embodiment, in which the rider is at the beginning of a pull phase.

The rear wheel 105 is driven by a typical chain 119. The chain 119 can be trained around a main sprocket 180 journaled to the main frame 110. Instead of a usual crank, a pair of reels 190 and 192 (sometimes referred to herein as drivers) composed of a right reel 190 and a left reel 192 are used. The right reel 190 is on the right side of the main sprocket 180 (sometimes referred to herein as a main driver), and left reel 192 is on the left side of the main sprocket 180. As shown in FIG. 2, reels 190 and 192 are coaxially mounted with the main sprocket 180 and have a driving relation with the main sprocket 180 through the intermediary of one-way clutches built into each of the reels 190 and 192.

Neither of said clutches are described in detail because they are of standard construction and are of the type used in the hubs of bicycle wheels to furnish a free-wheel transmission of power. The clutches may also be of other types that are well known to those having ordinary skill in the art. The clutches thus only transmit power when the main sprocket 180 is rotated forwardly or in a clockwise direction. Reels 190 and 192 are driven intermittently by the oscillation of rowing of the rowing mechanism 130 and serve to alternately drive the main sprocket 180 in a unidirectional manner, which in turn drives the rear wheel 105 by means of the chain 119.

The bicycle 100 also has a front wheel 107 mounted to the front fork 115 in any number of ways that are well known to those having ordinary skill in the art. The front fork 115 is pivotally connected to the main frame 110 so that the front fork 115 can be steered with the driver's feet. A pair of foot holders 150 are connected to the front fork 115, one to each arm. The rider steers the bicycle 100 by exerting uneven force against the foot holders 150. For example, if the rider exerts more force to the right foot holder versus the left foot holder, the bicycle will steer to the left and vice versa.

A gliding seat 140 is mounted on the glide bar 120. The glide seat 140 is not stationery on the glide bar 120, but instead can glide to and fro along most of the length of the glide bar 120 in response to the motion and forces provided by the rider. In addition, the gliding seat 140 may be locked in place at any point along the glide bar 140 with a locking nut (not shown).

Figure 8:
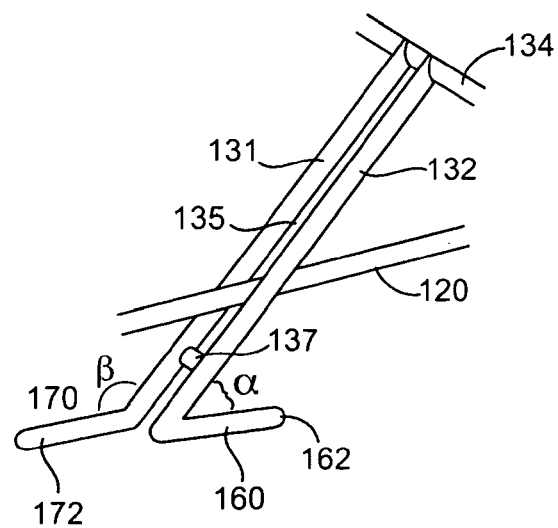
FIG. 8 is a side perspective view of a rowing assembly of the bicycle depicted in FIG. 1 in accordance with one embodiment.

As shown in more detail in FIG. 8, a rowing mechanism 130 is pivotally connected to the main frame 110 about a fulcrum 137. The fulcrum 137 allows the rowing mechanism 130 to oscillate forward in response to a pushing force and backward in response to a pulling force. The rowing mechanism includes a power lever 135 with a handle or cross-member 134 on one end and a second or bottom end. A pair of drive levers 160 and 170 extend from the second end of the power lever 135. The right drive lever 160 has a proximal end extending from the distal end of the right bar 132 of the power lever 135 and a distal end 162. Furthermore, the left drive lever 170 has a proximal end extending from the distal end of the left bar 131 of the power lever 135 and a distal end 172.

Figure 9:
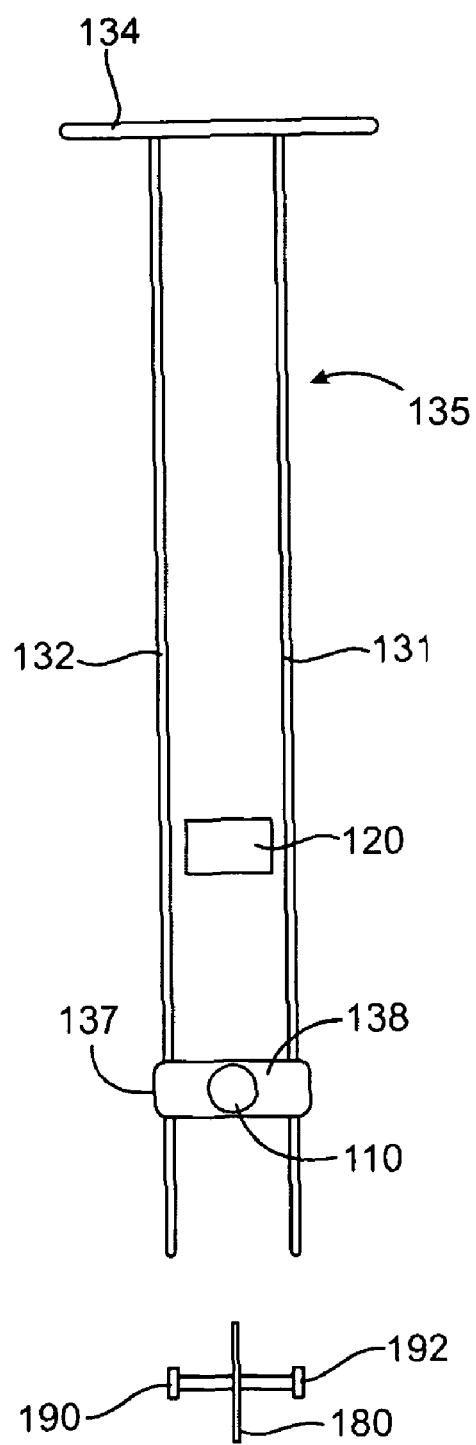
FIG. 9 is a schematic diagram of the rowing assembly of the bicycle depicted in FIG. 1 in accordance with one embodiment.

As shown in FIGS. 1 and 9, the power lever 135 can be composed of two spaced bars 131 and 132, which can be parallel to one another. Cross-member 134 serves to connect the two spaced bars 131 and 132 into one unitary frame, as well as serving as a handle for the rider. The bars 131 and 132 straddle the glide bar 120 and are connected to the main frame 110 at fulcrum 137. A cross-member 138 further joins the bars 131 and 132 to one another through a hole in support member 139 of frame 110. A pivot pin or bolt, or any other conventional or non-conventional components known to those having ordinary skill in the art, may be used to mount the power lever 135 to the main frame 110 at fulcrum 137. Thus power lever 135 is suspended by fulcrum 137 upon the main frame 110 in order that it may be free to oscillate forward and backward when operated by the rider.

Figure 10:
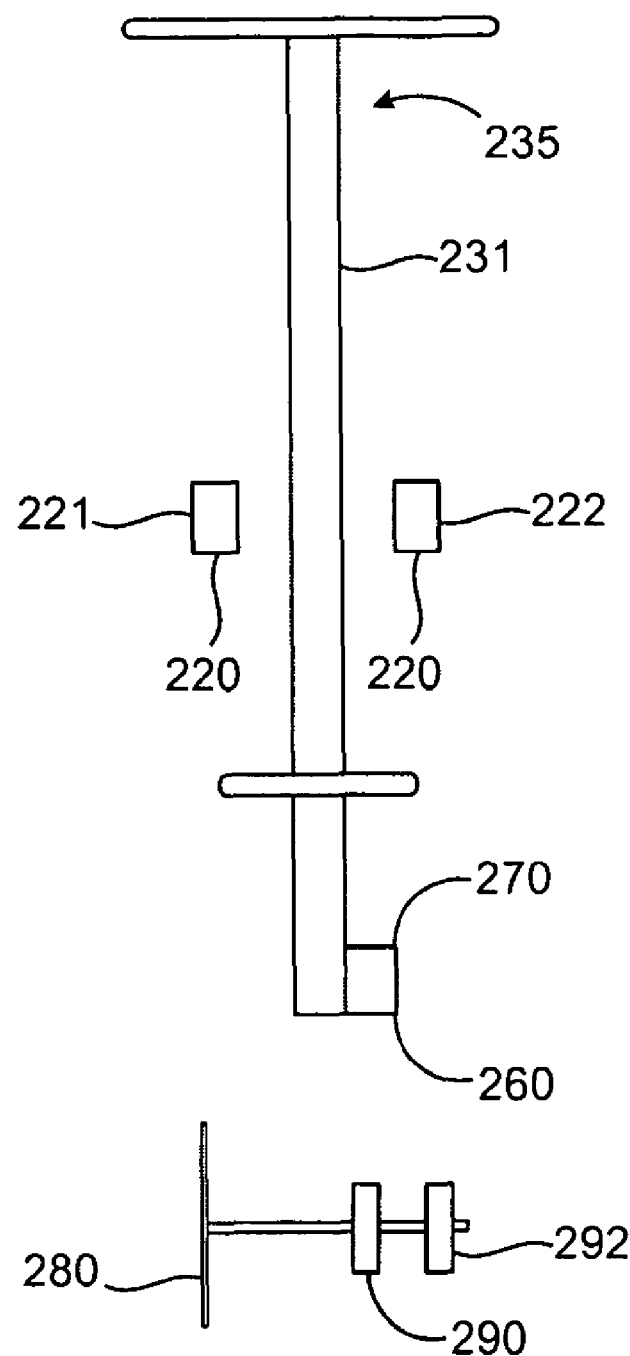
FIG. 10 is a schematic diagram of the rowing assembly of the bicycle depicted in FIG. 1 in accordance with another embodiment.

In an alternative embodiment as shown in FIG. 10, a power lever 235 can be made of one rigid bar 231 rather than parallel bars 131 and 132, and nested between a glide rail 220 made of parallel rails 221 and 222. In addition, the both reels 290 and 292 are on the sane side of the main sprocket 280. The drive levers 260 and 270 are on the same side of the power lever 235 and extend from the power lever 235 in opposite directions. Drive lever 260, which extends in a forward direction, acts as the pull-motion lever and driver lever 270, which extends in a backward direction, acts as the push-motion lever. The pull-motion lever 260 and push-motion lever 270 communicate with their respective reels 290 and 292 is in the same manner as described with respect to FIG. 1 below. Reels 290 and 292 communicate with main sprocket 280 also in the same manner as described with respect to FIG. 1 below.

Figure 11:
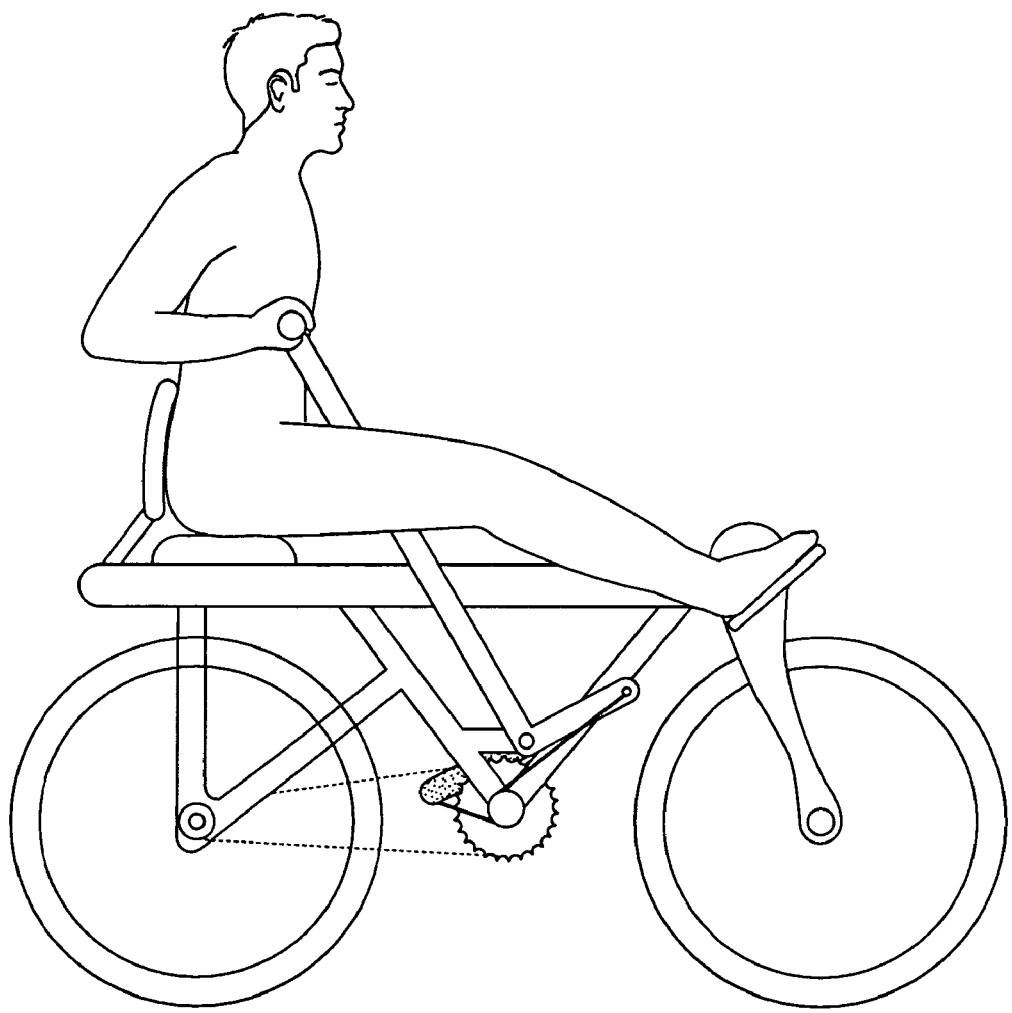
FIG. 11 is a side view of a bicycle in accordance with another embodiment.

As shown in FIG. 1, the fulcrum 137 can be set at a point proximal to the distal end of the power lever 135. As shown in FIG. 1, by lowering the fulcrum away from the handle of the power lever 135, the inventors herein have discovered that they can shorten the length of the bicycle 100 to that of a standard bicycle because a shorter range of pushing and pulling motion is required to efficiently propel the bicycle 100. In an alternative embodiment as shown in FIG. 11, the fulcrum 137 can be even further lowered so that it is set at the juncture between the power lever 135 and the drive levers 160 and 170. This design extends the power lever 135 giving it more leverage. Lowering the fulcrum 137 can provide as much as a 25 to 1 force advantage. Thus, the position of the fulcrum 137 permits the bicycle 100 to be shorter than all other row-type bicycles and the same size as a standard bicycle.

Drive levers 160 and 170 extend from the bottom end of the power lever 135. The right drive lever 160 extends from the bottom of the right bar 132 of the power lever 135, and the left drive lever 170 extends from the bottom of the left bar 131 of the power lever 135. As explained in more detail below, each of the drive levers 160 and 170 is in mechanical communication with the drive wheel 105 such that both a forward oscillation of the rowing mechanism 130 and a backward oscillation of the rowing mechanism 130 drive the drive wheel 105 in the same or forward direction of rotation.

As shown in FIG. 8, the right drive lever 160 extends in a forward direction from the second or bottom end of the power lever 135. The right drive lever 160 is also referred to herein as the pull-motion lever. The pull-motion lever 160 is at an angle $\alpha$ relative to the power lever 135. The left drive lever 170 extends in a backward direction from the second or bottom end of the power lever 135. The left drive lever 170 is also referred to herein as the push-motion lever. The push-motion lever 170 is at an angle $\beta$ relative to the power lever 135.

In one embodiment, left and right drive levers are formed integrally with the power lever 135. In one subembodiment, angle $\alpha$ and angle $\beta$ are each approximately 90°. In another subembodiment, angle $\alpha$ is less than 90° and angle $\beta$ is greater than 90°. In another subembodiment, angle $\alpha$ is greater than 90° and angle $\beta$ is less than 90°.

In another embodiment, left and right drive levers 160 and 170 are formed independently of power lever 135 and are coupled to power lever 135 in an adjustable manner, such that angles $\alpha$ and $\beta$ are adjustable. For example, the proximal ends of levers 160 and 170 can be coupled to the distal ends of right bar 132 and left bar 131 respectively using a locking ratchet mechanism that allows the levers 160 and 170 to pivot relative to the bars 131 and 132 until locked at any one of a number of predetermined angles.

A right cable 195 is connected at a first end to the distal end of lever 160. The right cable 195 is wrapped or trained around right reel 190 and its other end is attached to the right reel 190. A left cable 197 is connected at a first end to the distal end of lever 170. The left cable 197 is wrapped or trained around left reel 192 and its other end is attached to the left reel 192. The right and left reels 190 and 192 each comprises a spring or other tensioning mechanism that forces the reels to wind the cables 195 and 197 around the reels 190 and 192 in the absence of an unwinding force. In alternative embodiments, cables 195 and 197 may be replaced with chains or belts. All cables, chains and belts are sometimes referred to herein as conveyors. Moreover, cables, chains and belts can be used interchangeably and are considered equivalents of one another with respect to the present disclosure.

As shown and described above, the reels 190 and 192 are in direct mechanical communication with the drive levers 160 and 170, and the drive levers 160 and 170 function as part of the power lever 135. This provides a direct drive from the power lever 135 to the main sprocket 180, decreasing the arc of the power lever 135 at the power or user end. The positioning of the main sprocket 180 and reels 190 and 192 is beneath the power lever. All of this allows the fulcrum 137 to be near or at the bottom or distal end of the power lever 135 providing as much as 25 to 1 force advantage. This also permits the bicycle to be shorter than all other row bicycles and the same size as a standard mountain or road bicycle.

As shown in FIG. 1, at the beginning of the pull phase of the modified row movement, the power lever 135 is at a forward position. The rider sits with bended knees near the front of the bicycle 100 with arms extended and holding onto the handle of the lever 135. The distal end of the right lever 160 is adjacent the right reel 190 and is consequently as near to the right reel as possible. This is the lowest point to which the distal end of the right lever 160 will drop, and at this point, the right cable 195 is completely trained around the right reel 190 (see also FIG. 2). At the same time, the distal end of the left lever 170 is raised up near the glide bar 120 and is consequently as distant from the left reel 192 as possible. This is the highest point to which the distal end of the left lever 170 will rise, and at this point, the left cable 197 is completely or almost completely unwound from the left reel 192.

Figure 3:
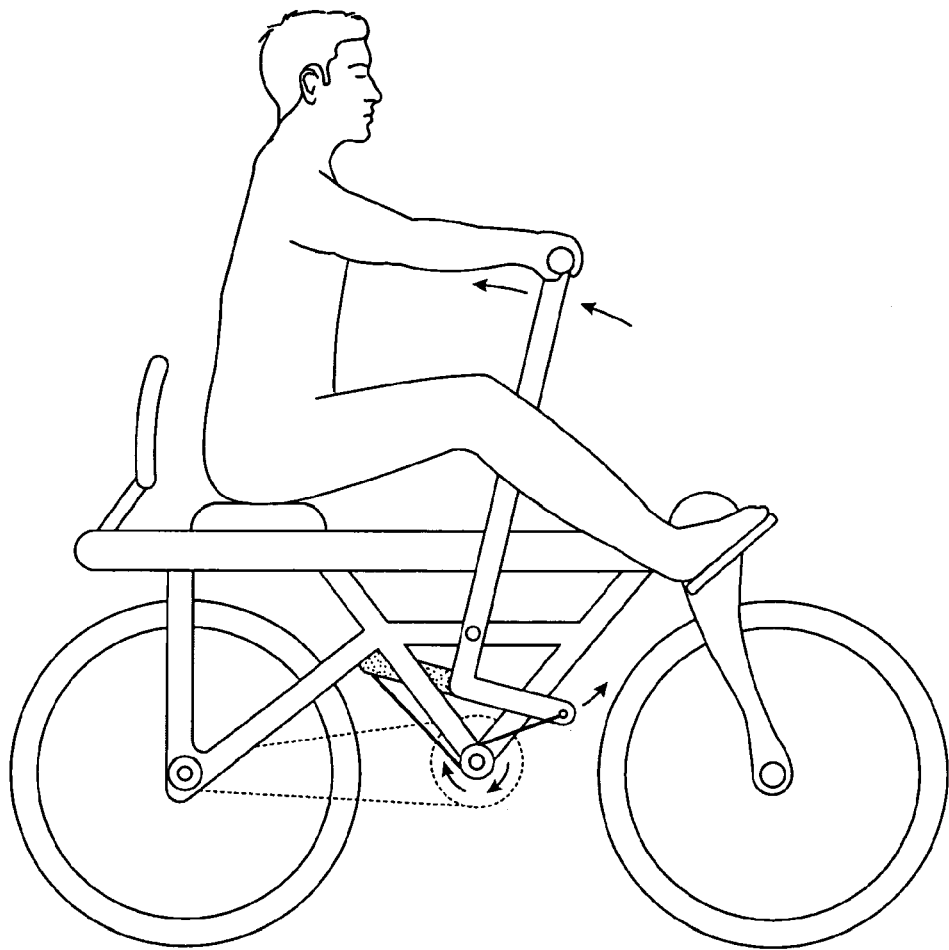
FIG. 3 is side view of the bicycle depicted in FIG. 1, in which the rider is at the middle of a pull phase.
Figure 4:
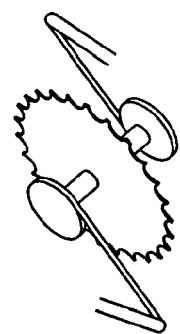
FIG. 4 is a top perspective view of the reel mechanism depicted in FIG. 2, in which the rider is at the middle of a pull phase.

FIG. 3 shows the rider in a middle of the pull phase of the modified row movement. As the rider begins to pull back on the power lever 135, he will begin to extend his legs and straighten out his knees and create a pulling force on the power lever 135. At this time, the glide seat 140 will begin to glide backward along the glide bar 120. The power lever 135 is pulled backward in a backward rowing motion. This causes power lever 135 to pivot about the fulcrum 137, and that results in the movement of the distal end of the right lever 160 away from the right reel 190. As the distal end of the right lever 160 arcs away from the right reel 190, it pulls the right cable 195, which causes the right cable 195 to unwind (see also FIG. 4). The unwinding of the right cable 195 causes the right reel 190 to rotate in a clockwise direction, which forces the main sprocket 180 to rotate in a clockwise direction. The rotation of the main sprocket 180 causes the drive chain 119 to drive the rear wheel 105, so that the bicycle is propelled in a forward direction. At the same time, the pulling force results in the movement of the distal end of the left lever 170 toward the left reel 192. As the distal end of the left lever 170 arcs toward the left reel 192, the tensioned left reel 192 rewinds the left cable 197 around the left reel 192 in a counter-clockwise rotation. During the counter-clockwise rotation, a clutch (described above) allows the left reel 192 to be disengaged from the main sprocket 180 so that the counter-clockwise rotation of the left reel 192 has no effect on the main sprocket 180.

Figure 5:
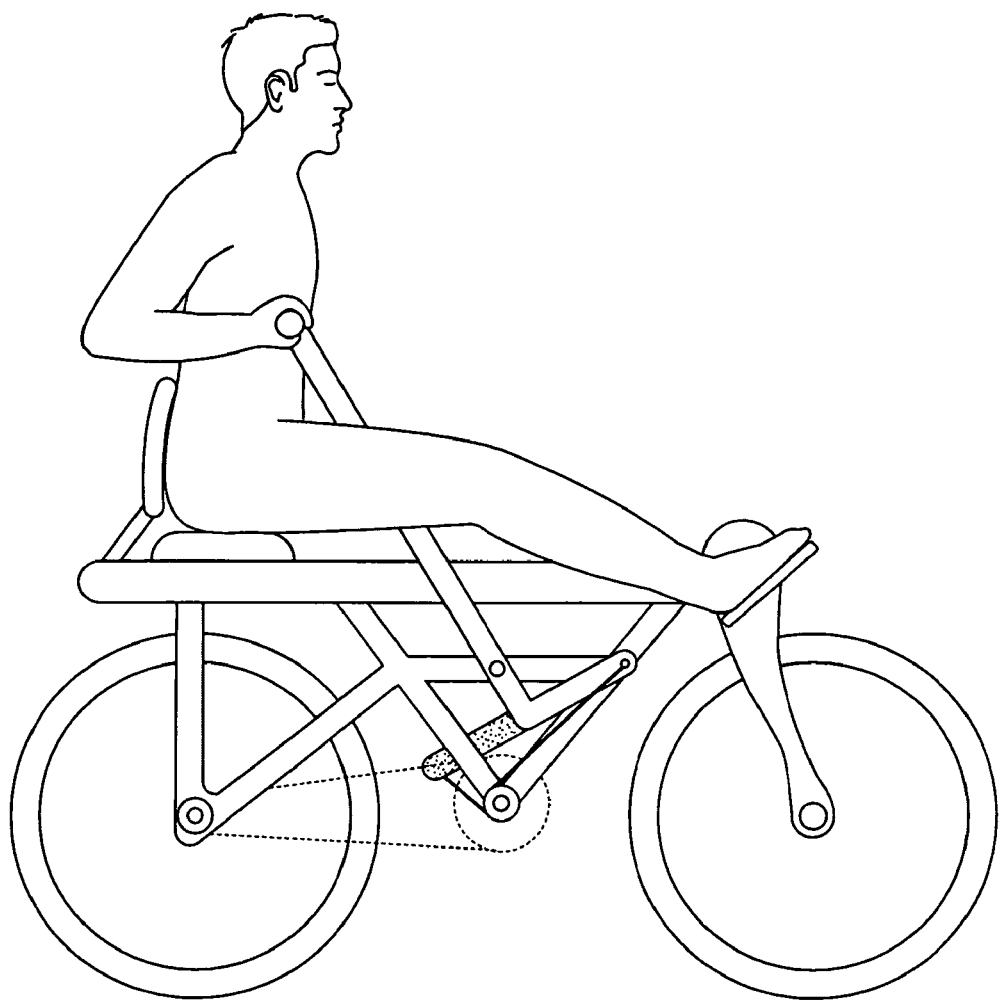
FIG. 5 is a side view of the bicycle depicted in FIG. 1, in which the rider is at the end of a pull phase and beginning of a push phase.
Figure 6:
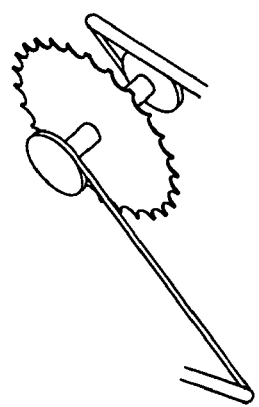
FIG. 6 is a top perspective view of the reel mechanism depicted in FIG. 2, in which the rider is at the end of a pull phase and the beginning of a push phase.

FIG. 5 shows the end of the pull phase and the beginning of the push phase. FIG. 5 also shows that the bicycle can have a rear backrest. At this time, the power lever 135 is at a rear or backward position. The rider sits with legs extended near the rear of the bicycle 100 with arms pulled in toward the chest and holding onto the handle of the power lever 135. The distal end of the right lever 160 is raised up near the glide bar 120 and is consequently as distant from the right reel 190 as possible. This is the highest point to which the distal end of the right lever 160 will rise, and at this point, the right cable 195 is completely or almost completely unwound from the right reel 190 (see also FIG. 6). No further forward driving power is available from the right reel 190 at this point. At the same time, the distal end of the left lever 170 is adjacent the left reel 192 and is consequently as near to the left reel 192 as possible. This is the lowest point to which the distal end of the left lever 170 will drop, and at this point, the left cable 197 is completely trained around the left reel 192.

Figure 7:
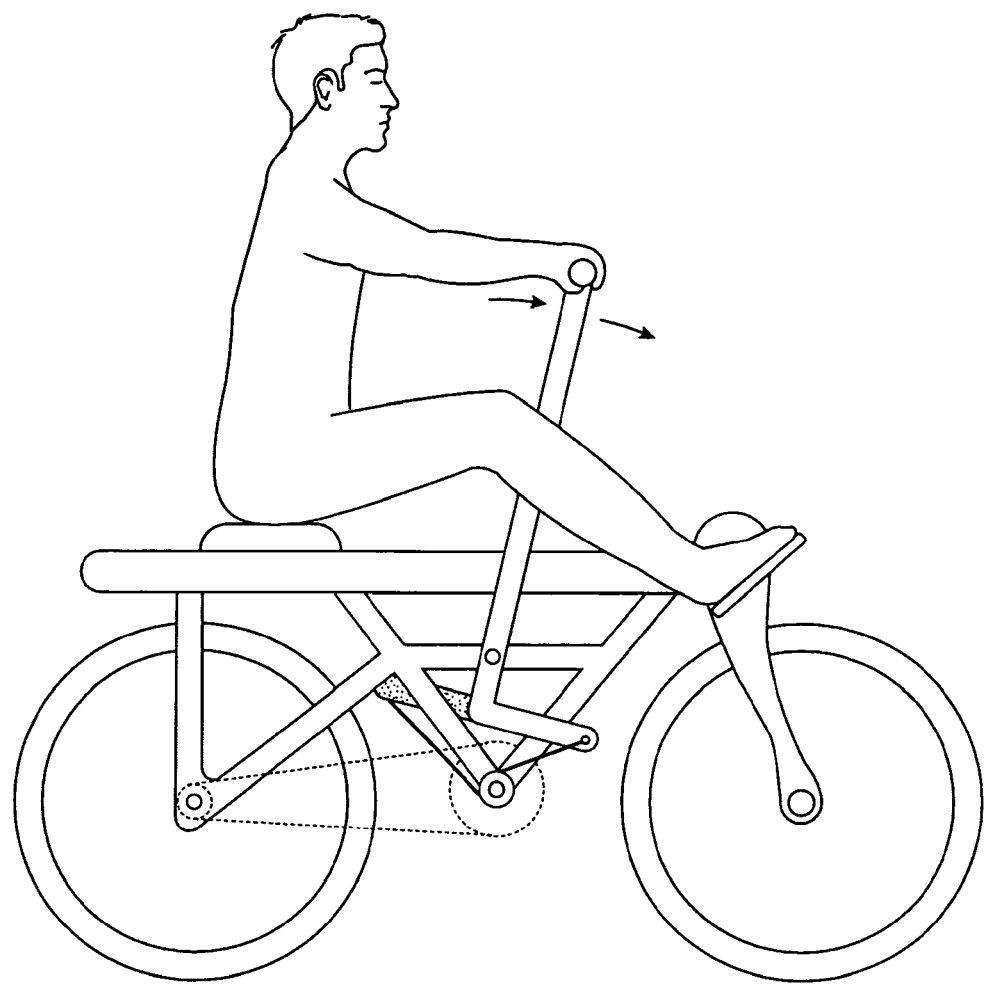
FIG. 7 is a side view of the bicycle depicted in FIG. 1, in which the rider is at the middle of a push phase.

FIG. 7 shows the rider in a middle of the push phase of the modified row movement. This is the phase in which the motion departs from a rowing motion and becomes more similar to a bench press. As the rider begins to push the power lever α forward, he will begin to bend his knees and straighten out his arms creating a pushing force on the power lever 135. At this time, the glide seat 140 will begin to glide forward along the glide bar 120. The power lever 135 is pushed forward in a forward bench press motion. This causes power lever 135 to pivot about the fulcrum 137, and that results in the movement of the distal end of the left lever 170 away from the left reel 192. As the distal end of the left lever 170 arcs away from the left reel 192, it pulls the left cable 197, which causes the left cable 197 to unwind. The unwinding of the left cable 197 causes the left reel 192 to rotate in a clockwise direction, which forces the main sprocket 180 to rotate in a clockwise direction. The rotation of the main sprocket 180 causes the drive chain 119 to drive the rear wheel 105, so that the bicycle is propelled in a forward direction. At the same time, the pulling force results in the movement of the distal end of the right lever 160 toward the right reel 190. As the distal end of the right lever 160 arcs toward the right reel 190, the tensioned right reel 190 rewinds the right cable 195 around the right reel 190 in a counter-clockwise rotation. During the counter-clockwise rotation, a clutch (described above) allows the right reel 190 to be disengaged from the main sprocket 180 so that the counter-clockwise rotation of the right reel 190 has no effect on the main sprocket 180. Accordingly, both a forward pushing motion and a backward pulling motion cause the bicycle to be propelled in a forward direction.

Figure 12:
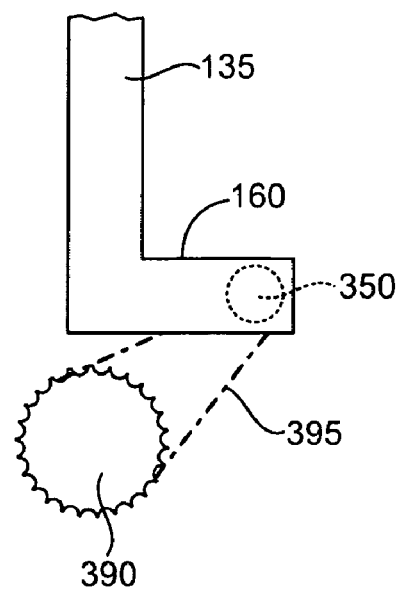
FIG. 12 is a side view of a bicycle propulsion system in accordance with one embodiment.
Figure 13:
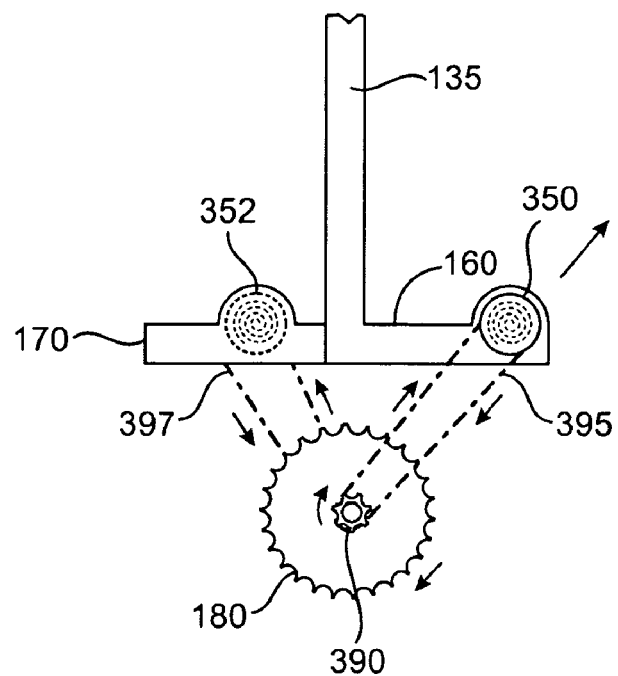
FIG. 13 is a side view of the bicycle propulsion system depicted in FIG. 11 with additional detail.

FIGS. 12 and 13 show another embodiment, in which additional sprockets and chains are used instead of reels and cables. FIG. 12 shows a right drive lever 160 in mechanical communication with a right sprocket 390 through a chain 395. One end of the chain 395 is attached at a connecting point on the distal end of the drive lever 160, is trained around the right sprocket 390, and attached at its other end to a tensioned right lever reel 350 journaled to the distal end of the right drive lever 160. The chain 395 is wound around the tensioned right lever reel 350 in a manner that allows it to be unwound. The tensioned right lever reel 350 comprises a spring or other tensioning mechanism that forces the reel 350 to wind the chain 395 around the reel 350 in the absence of an unwinding force.

FIG. 13 shows a more detailed illustration of the same embodiment depicted in FIG. 12, in which the left side of the propulsion mechanism is shown as well. Just as with the right drive lever 160, the left drive lever 170 is in mechanical communication with a left sprocket (not shown) through a chain 397. The left sprocket is of the same type as the right sprocket 390. One end of the chain 397 is attached at a connecting point on the distal end of the left drive lever 170, is trained around the left sprocket, and attached at its other end to a tensioned left lever reel 352 journaled to the distal end of the left drive lever 170. The chain 397 is wound around the tensioned left lever reel 352 in a manner that allows it to be unwound. The tensioned left lever reel 352 comprises a spring or other tensioning mechanism that forces the reel 352 to wind the chain 397 around the reel 352 in the absence of an unwinding force.

Accordingly, when the power lever 135 is pulled backward, the right lever 160, as before, rises upward in an arc, causing the distal end of the lever 160 to pull on the chain 395. The chain 395 unwinds and drives the right sprocket 390 in a clockwise rotation, which, in turn, drives the main sprocket 180 in a clockwise rotation. The rotation of the main sprocket 180 drives the rear wheel in a forward direction through main chain 119. During the push motion, the right lever 160 reverses its direction. The tensioned right lever reel 350 rewinds the chain 395, which reverses the rotation of the right sprocket 390. However, the one-way clutch between the right sprocket 390 and main sprocket 180 allows the right sprocket 390 to disengage from the main sprocket 180, so that the reverse rotation of the right sprocket 390 has no effect on the main sprocket 180.

When the power lever 135 is pushed forward, the left lever 170, as before, rises upward in an arc, causing the distal end of the left lever 170 to pull on the chain 397. The chain 397 unwinds and drives the left sprocket (not shown) in a clockwise rotation, which in turn, drives the main sprocket 180 in a clockwise rotation. The rotation of the main sprocket 180 drives the rear wheel in a forward direction through main chain 119. During the pull motion, the left lever 170 reverses its direction. The tensioned left lever reel 352 rewinds the chain 397, which reverses the rotation of the left sprocket. However, the one-way clutch between the left sprocket and main sprocket 180 allows the left sprocket to disengage from the main sprocket 180, so that the reverse rotation of the left sprocket has no effect on the main sprocket 180.

Figure 14:
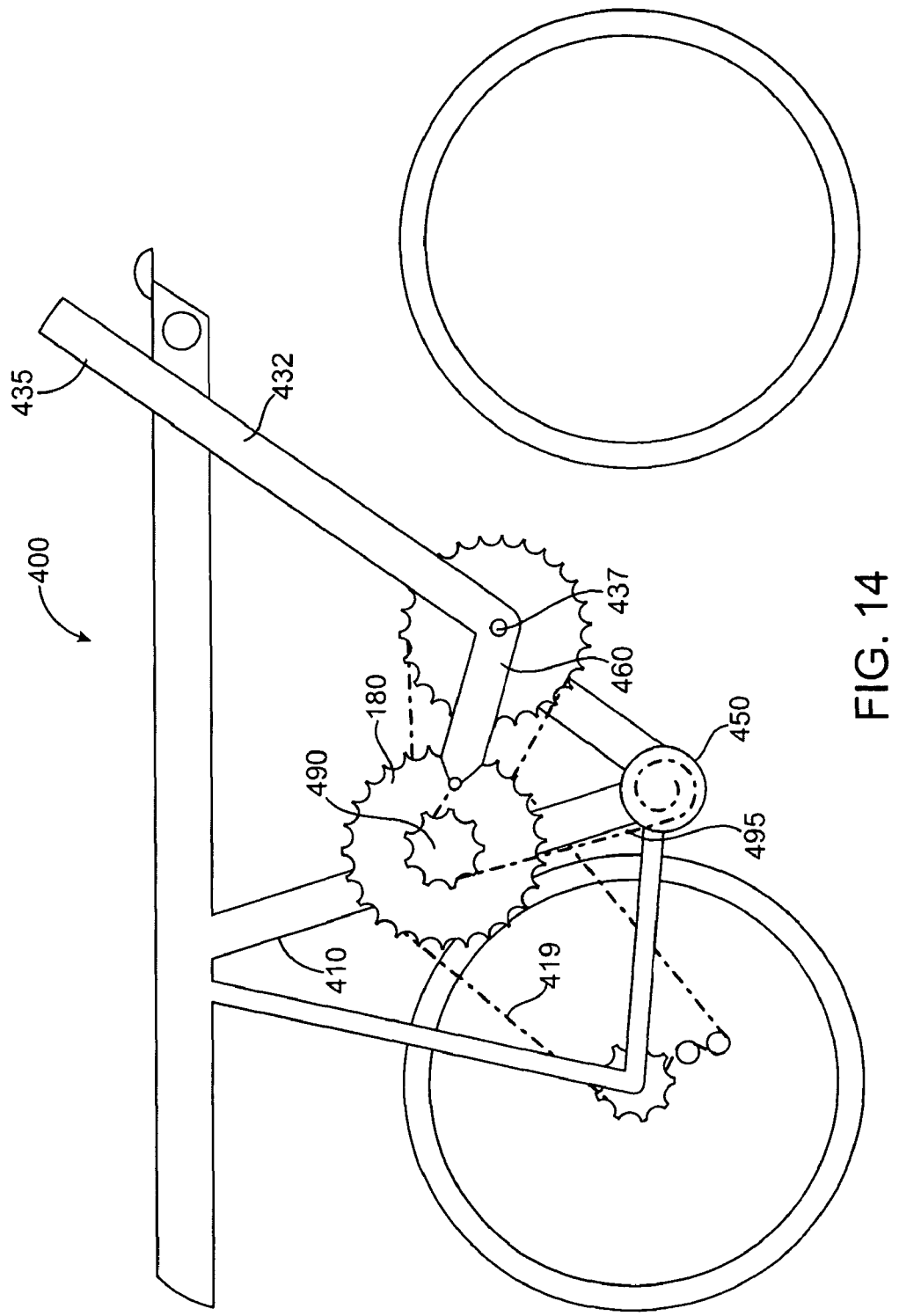
FIG. 14 is a right side view of a bicycle in accordance with another embodiment.
Figure 15:
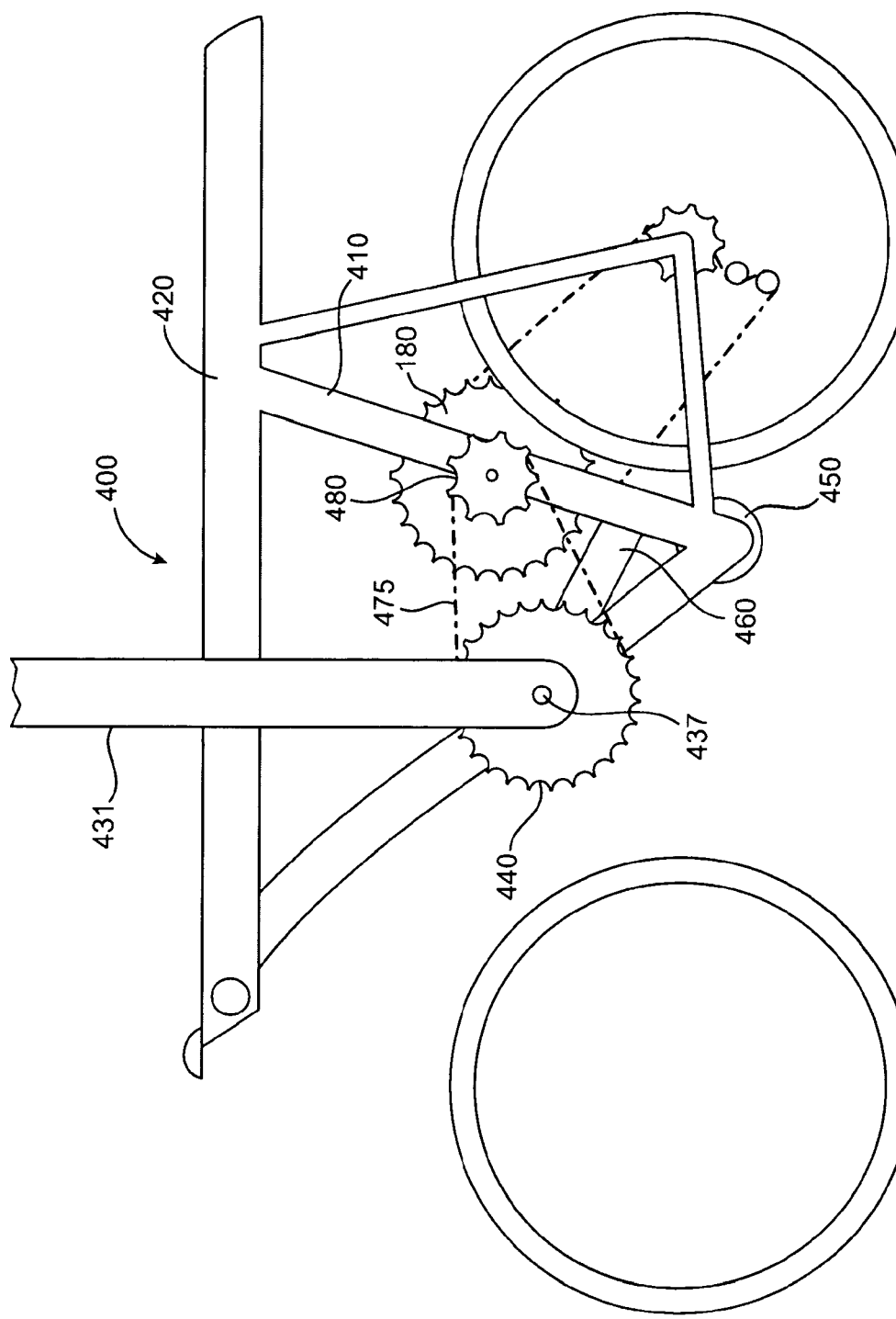
FIG. 15 is a left side view of the bicycle depicted in FIG. 14.
Figure 16:
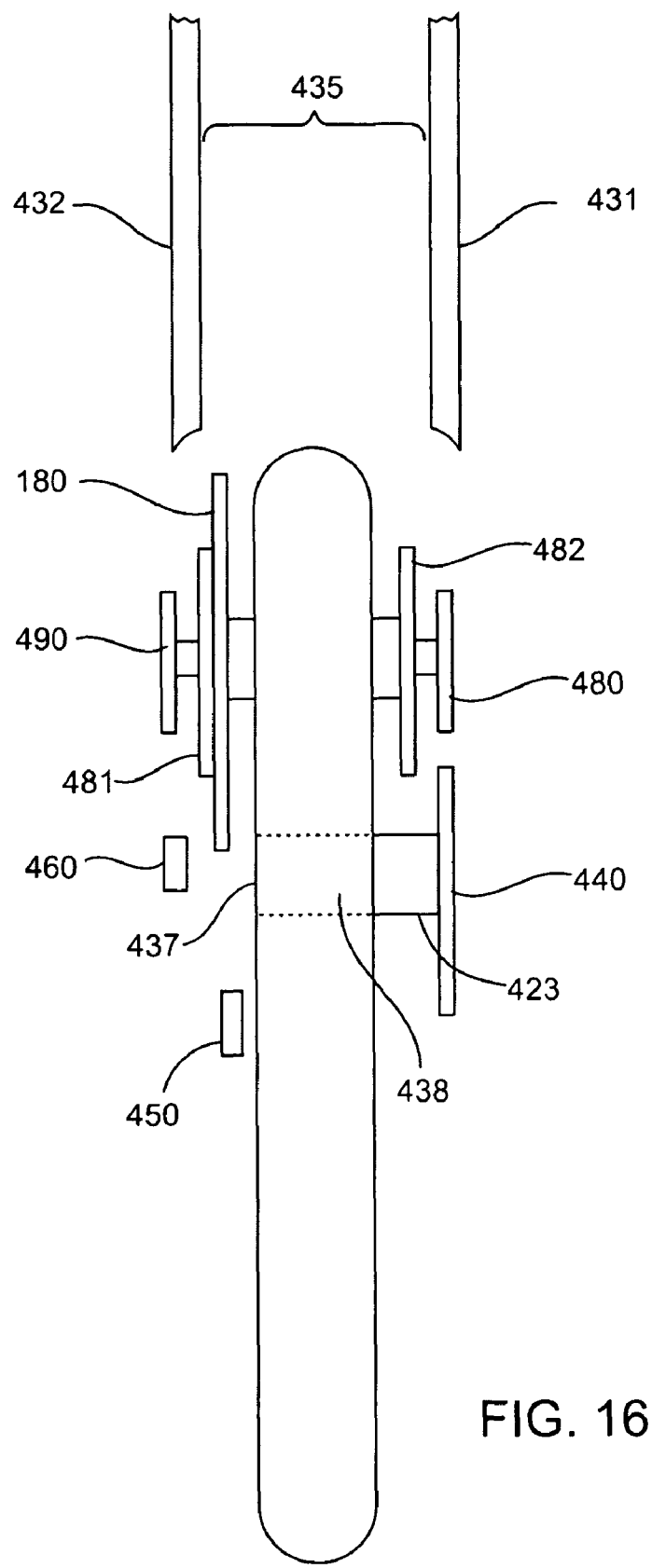
FIG. 16 is a front view of the bicycle depicted in FIG. 14.

FIGS. 14-16 depict another embodiment of a bicycle propelled by a modified rowing motion. Described are only those elements that differ from the previous embodiments described above. The bicycle 400 has a main power lever 435, which as before, the can be composed of two spaced bars 131 and 132, which can be parallel to one another.

Looking now at FIG. 14 in particular, the right bar 432 is connected at its distal end to a right side drive lever 460, also referred to as a pull-motion lever. The pull-motion lever 460 is connected at its distal end to a drive chain 495, which is trained around a right sprocket 490, sometimes referred to as a pull-motion sprocket. The distal end of the chain 495 is connected to a tensioned reel 450. The tensioned reel 450 comprises a spring or other tensioning mechanism that forces the reel 450 to wind the chain 495 around the reel 450 in the absence of an unwinding force. The tensioned reel 450 can be located at a point lower than the pull sprocket 490. The pull sprocket 490 is coupled to the main sprocket 180 through a one-way clutch 481 that only allows the transmission of power in the forward or clockwise direction of rotation. Thus, when the pull sprocket 490 is rotating clockwise, it causes the main sprocket 180 to rotate clockwise as well. When the pull sprocket 490 is rotating counter-clockwise, the one-way clutch disengages the pull sprocket 490 from the main sprocket 180 so that the rotation of the pull sprocket 490 has no effect on the main sprocket 180.

Turning now to FIG. 15, the left bar 431 is connected at its distal end to the center of a primary push sprocket 440. The primary push sprocket 440 is coupled to the distal end of the left bar 431 in a manner that does not allow the primary push sprocket 440 to rotate relative to the left bar 431. In other words, it is fixedly coupled to the left bar 432. The primary push sprocket 440 communicates with a secondary push sprocket 480 through a push drive chain 475. The secondary push sprocket 480 is coupled to the main sprocket 180 through a one-way clutch 482 that only allows the transmission of power in the forward or clockwise direction of rotation. Thus, when the secondary push sprocket 480 is rotating clockwise it causes the main sprocket 180 to rotate clockwise as well. When the secondary push sprocket 480 is rotating counter clockwise, the one-way clutch disengages the secondary push sprocket 480 from the main sprocket 180 so that the rotation of the secondary push sprocket 480 has no effect on the main sprocket 180.

The bars 431 and 432 straddle the glide bar 420 and are connected to the main frame 410 at fulcrum 437. A crossmember 438 joins the bars 431 and 432 to one another through a hole in a support member (not shown) of frame 410. A pivot pin or bolt, or any other conventional or non-conventional components known to those having ordinary skill in the art, may be used to mount the power lever 435 to the main frame 410 at fulcrum 437. Thus, power lever 435 is suspended by fulcrum 437 upon the main frame 410 in order that it may be free to oscillate forward and backward when operated by the rider.

The pull-motion lever 460 extends in a backward direction from the second or bottom end of the right side bar 432. The pull motion lever 460 is at an angle c relative to the bar 432. In one embodiment, pull-motion lever 460 is formed integrally with bar 432. In one subembodiment, angle c is approximately 90°. In another subembodiment, angle c is less than 90°. In yet another subembodiment, angle c is greater than 90°. In another embodiment, pull motion lever 460 is formed independently of bar 432 and is coupled to bar 432 in an adjustable manner, such that angle c is adjustable. For example, the proximal end of levers 460 can be coupled to the distal end of right bar 432 using a locking ratchet mechanism that allows the lever 460 to pivot relative to the bar 432 and until locked at anyone of a number of predetermined angles.

When power lever 435 is pulled backward, the distal end of the pull-motion lever 460 moves in a downward arc, causing the distal end of the lever 460 to pull on the chain 495. The chain 495 unwinds from the tensioned reel 450 and drives the right pull sprocket 490 in a clockwise rotation, which in turn, drives the main sprocket 180 in a clockwise rotation. The rotation of the main sprocket 180 drives the rear wheel in a forward direction through main chain 419. During the push motion, the pull-motion lever 460 reverses its direction. The tensioned reel 450 rewinds the chain 495, which reverses the rotation of the right sprocket 490. However, the one-way clutch 481 between the right sprocket 490 and main sprocket 180 allows the right sprocket 490 to disengage from the main sprocket 180, so that the reverse rotation of the pull sprocket 490 has no effect on the main sprocket 180.

When the power lever 435 is pushed forward, the forward movement of the left bar 431 causes the primary push sprocket 440 to rotate in a clockwise direction, which is translated to the secondary push sprocket 480 through push chain 475. That in turn drives the main sprocket 180 in a clockwise rotation, which in turn drives the rear wheel in a forward direction through main chain 119. During the pull motion, the left bar 431 causes the primary push sprocket 440 to rotate in a counter-clockwise direction, which is translates into a counter-clockwise rotation in the secondary push sprocket 480 through push chain 475. The counter-clockwise rotation of the secondary push sprocket 480 is not, however, translated into a rotation in the main sprocket 180, because the one-way clutch 482 between the secondary push sprocket 480 and the main sprocket 180 allows the secondary push sprocket 480 to disengage from the main sprocket 180, so that the reverse rotation of the secondary push sprocket 480 has no effect on the main sprocket 180. Alternatively, a one-way clutch can be mounted between the primary push sprocket 440 and the left bar 431, so that only a push motion translates into rotation on the primary push sprocket 440.

As shown and described above, pull sprocket 490 is in direct mechanical communication with the pull-motion drive lever 460, and the drive lever 460 functions as part of the power lever 435. This provides a direct drive from the power lever 435 to the main sprocket 180, decreasing the arc of the power lever 435 at the power or user end. This allows the fulcrum 437 to be near or at the bottom or distal end of the power lever 435 providing as much as 25 to 1 force advantage. This also permits the bicycle to be shorter than all other row bicycles and the same size as a standard mountain or road bicycle.

Figure 17:
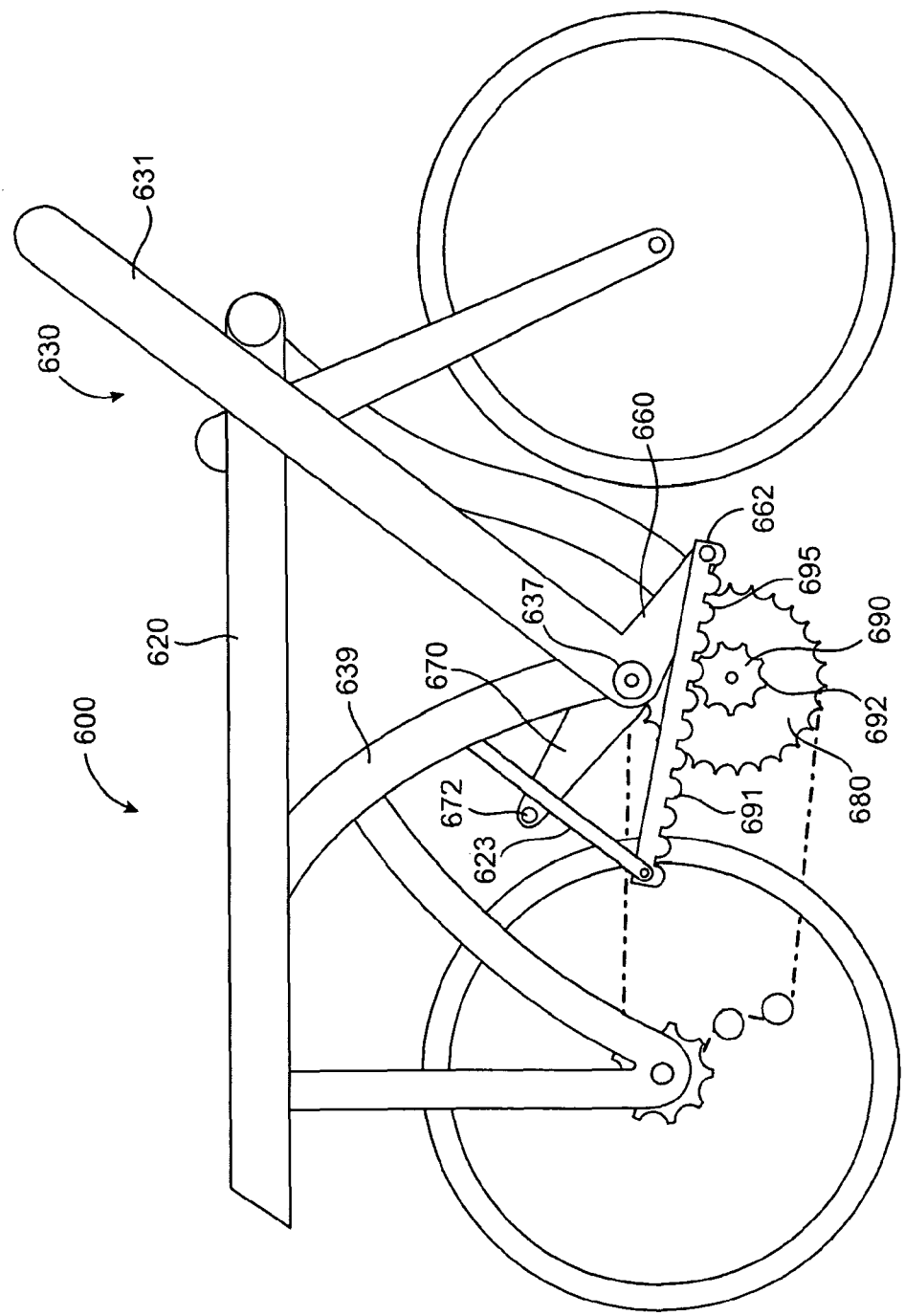
FIG. 17 is a right side view of a bicycle in accordance with another embodiment.

FIG. 17 depicts another embodiment of a row propelled bicycle. The propulsion system of bicycle 600 is similar to the embodiment depicted in FIG. 1. The rear-wheel drive system can be the same or similar to that described with respect to the embodiment shown in FIG. 1. The main difference is that power is propagated through a pair of toothed bars 695 (only the right bar can be seen from the angle of the bicycle 600 shown in FIG. 17) in what can be described as a rack and pinion system. The toothed bars 695 (the rack) engage a pair of corresponding sprockets 690 (the pinion) (only the right sprocket can be seen from the angle of the bicycle 600 shown in FIG. 17).

As shown in FIG. 17, the teeth 691 of the toothed bars engage the teeth 692 of the sprockets. The right toothed bar 695 is pivotally connected at its distal end to the distal end 662 of the drive lever 660. The proximal end of the toothed bar 695 is pivotally connected to a distal end of a rocking bar 623, which is pivotally connected to the bicycle frame 639 at its proximal end. Thus, during the rowing cycle, when the rider pulls the rowing mechanism 630 during the pulling phase, the right toothed bar 695 rolls across the sprocket 690 in the forward direction. The sprocket 690 is coaxially mounted with a main sprocket 680 and has a driving relation with the main sprocket 680 through an intermediary of a one-way clutch. When the sprocket 690 is revolving in a clockwise direction, the sprocket 690 engages the main sprocket 680 and propels the bicycle forward. Thus, when the rider is in the pulling phase, the bicycle is propelled forward by the action of the drive lever 660.

During the rowing cycle, when the rider pushes the rowing mechanism 630 during the pushing phase, the right toothed bar 695 rolls across the sprocket 690 in a backward direction. The sprocket 690 is not engaged to the main sprocket 680, and thus there is no transmission of power from sprocket 690 to sprocket 680 during the pushing phase. During the pushing phase, however, the left drive lever 670 moves the left toothed bar (not shown) so that it rolls across the left sprocket (not shown) in the forward direction. The left sprocket is coaxially mounted with the main sprocket 680 and has a driving relation with the main sprocket 680 through an intermediary of a one-way clutch, just like the right sprocket 690. When the left sprocket is revolving in a clockwise direction, the left sprocket engages the main sprocket 680 and propels the bicycle 600 forward. Thus, when the rider is in the pushing face, the bicycle is propelled forward by the action of the drive lever 670. During the rowing cycle, when the rider pulls the rowing mechanism 630 during the pulling phase, the left toothed bar rolls across the left sprocket in a backward direction. The left sprocket is not engaged to the main sprocket 680, and thus there is no transmission of power from the left sprocket to sprocket 680 during the pulling phase.

Figure 18:
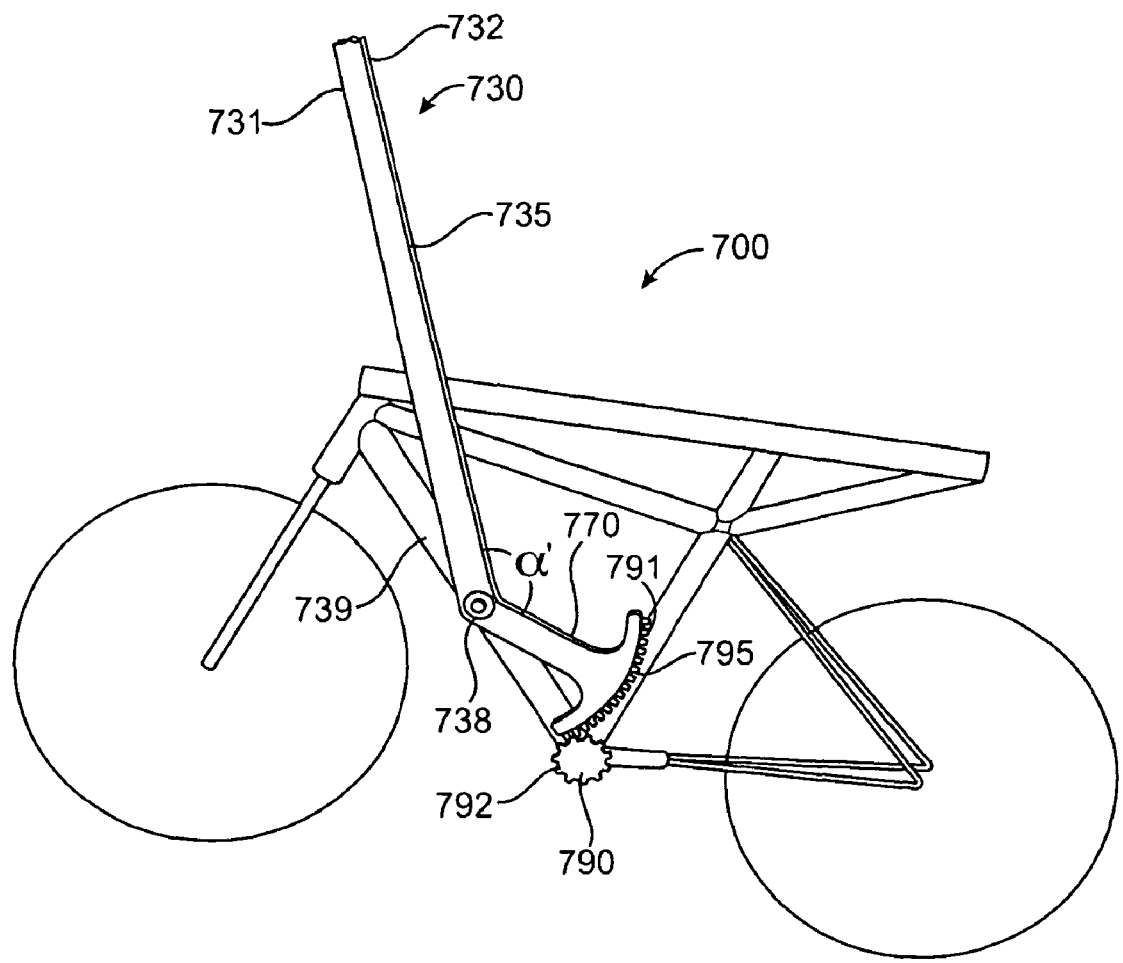
FIG. 18 is a perspective view of a bicycle in accordance with another embodiment.
Figure 20:
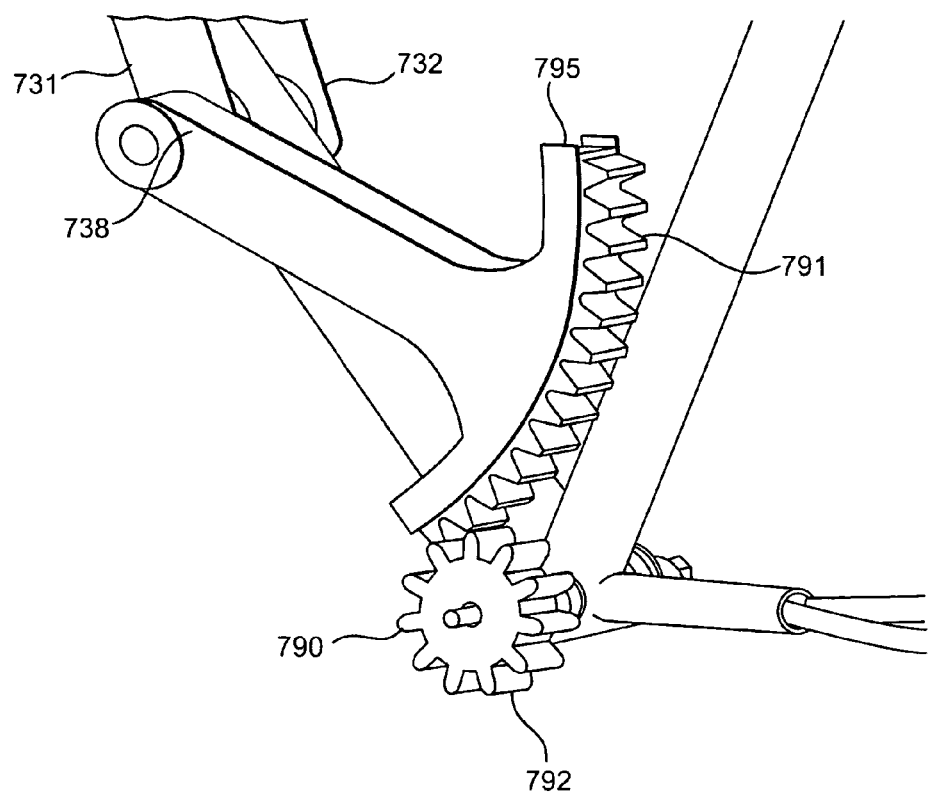
FIG. 20 is a close-up perspective view of the rack and pinion lever of the bicycle depicted in FIG. 18.

FIG. 18 depicts another embodiment of a row propelled bicycle. In this embodiment, only the pulling motion propels the bicycle. The propulsion system of bicycle 700 is similar to the embodiment depicted in FIG. 1 and has a rack and pinion system similar to the propulsion system of bicycle 600 depicted in FIG. 17. The rear-wheel drive system can be the same or similar to that described with respect to the embodiment shown in FIG. 1. The main difference is that power is propagated through a curved bar with teeth or rack 795. The rack 795 engages a corresponding sprocket 790 or pinion. As shown in FIGS. 18 and 20, the teeth 791 of the rack engage the teeth 792 of the sprocket 790.

Figure 19:
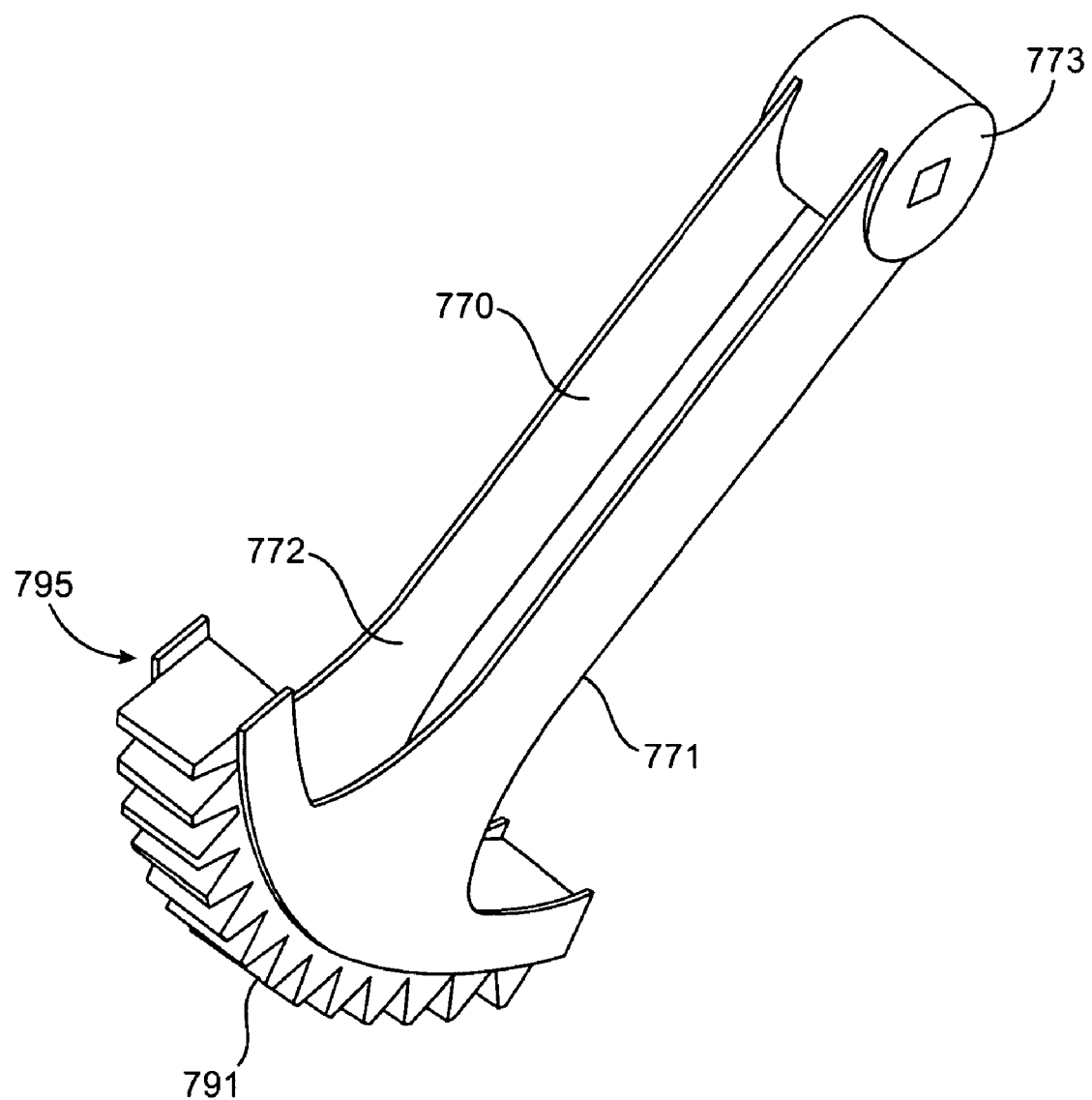
FIG. 19 is a perspective view of the lever of the bicycle depicted in FIG. 18.

The rack 795 is curved in shape and has a connection arm 770 extending radially inward from the curved rack 795 toward the front of the bike 700. The connection arm and rack 795 can be of a unibody construction, or can be made of separate parts that are welded, glued, screwed or otherwise connected to one another. As shown in FIG. 19, the arm 770 can be made of two anchor-like bars 771 and 772 joined to a hollowed pivot drum 773 at their distal ends and joined to the curved rack 795 at the proximal ends.

A rowing mechanism 730 is used by the bike rider to drive the bike. The rowing mechanism 730 includes a drive lever 735 similar to the drive lever 135 shown in FIGS. 1 and 9, such that it has two arms 731 and 732 coming down opposite sides of the bike 700 frame 739. The pivot drum 773 of the rack 795 bar 770 is connected to the distal end of one of the arms 731 or 732 of the drive lever 735 at an angle $\alpha^1$. The pivot drum 773 can be connected to either arm 731 or 732. If it is connected to left arm 731, then the rack 795 will sit on the left side of the bike 700, and if it is connected to arm 732, then the rack 795 will sit on the left side of the bike 700. The connection between the pivot drum 773 and arm 731 or 732 can be formed in any manner known to those of skill in the art and is depicted generally in FIG. 20.

Angle $\alpha^1$ can be adjustable so that the angle between the rowing mechanism 730 and the rack 795 can be adjusted. During the rowing motion, however, $\alpha^1$ will be fixed so that the rider gets maximum torque and propulsion. Alternatively, the drive lever 735 and arm 770 can be made of a unibody construction. In such an embodiment, $\alpha^1$ would be fixed at an optimum angle depending on the rider's preference or needs.

The drive lever 735 and arm 770 are pivotally connected to the bicycle frame 739 at pivot point or fulcrum 738. Thus, during the rowing cycle, when the rider pulls the rowing mechanism 730 during the pulling phase, the rack 795 rolls downward across the pinion 790 in the downward direction. The pinion or sprocket 790 is coaxially mounted with a main sprocket (not shown) and has a driving relation with the main sprocket through an intermediary of a one-way clutch. When the sprocket 790 is revolving in a counter-clockwise direction, the sprocket 790 engages the main sprocket and propels the bicycle forward. Thus, when the rider is in the pulling phase, the bicycle is propelled forward by the backward motion of the rowing mechanism 730. During the rowing cycle, when the rider pushes the rowing mechanism 730 during the pushing phase, the rack 795 rolls across the sprocket 790 in an upward direction. The sprocket 790 is not engaged to the main sprocket, and thus there is no transmission of power from sprocket 790 to the main sprocket during the pushing phase. Alternatively, the rear wheel gears can be engaged in a traditional free-wheeling mechanism so that any clockwise rotation of the rear-wheel gear does not translate into a backward rotation of the rear wheel. This type of free-wheel gearing is well known in the art and needs no further description.

Although FIGS. 18-20 depict only one rack 795 on only one side of the bike frame 739, there can be two racks connected on opposite sides of the frame 739 to the drive lever 735. One rack 795 can be connected to arm 731, and the other rack 795 can be connected to arm 732.

Figure 21:
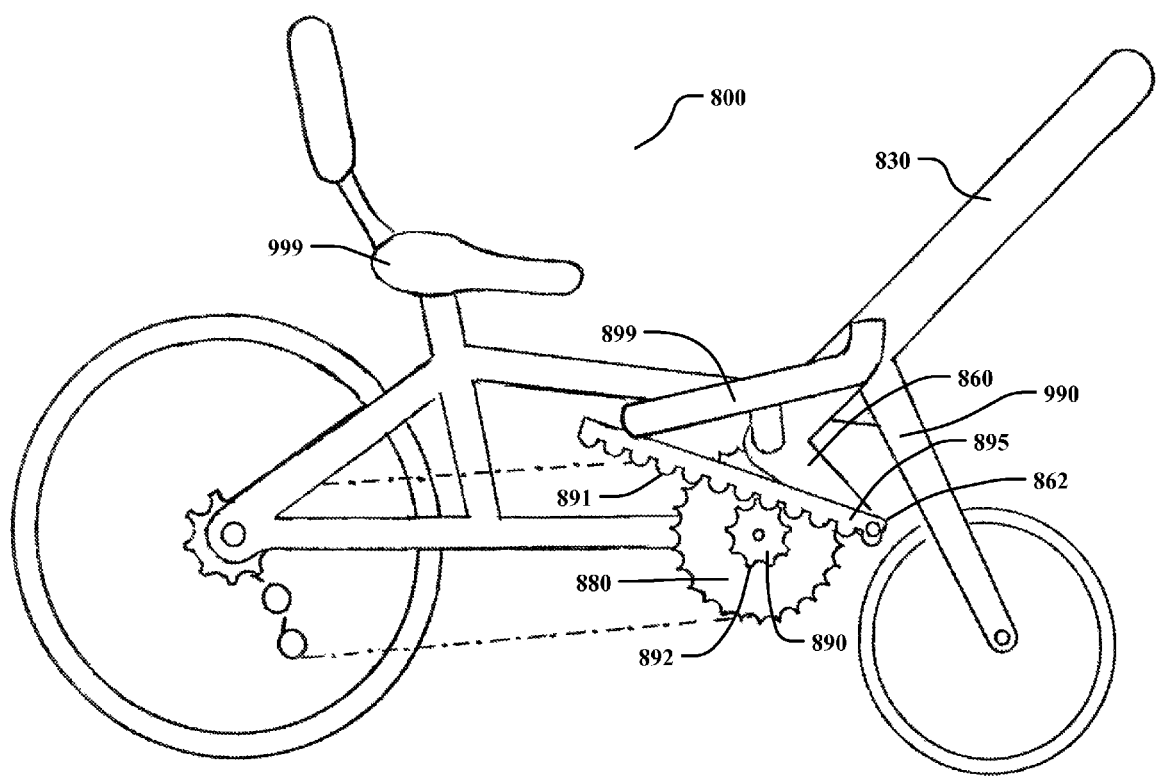
FIG. 21 is a right side view of a bicycle in accordance with another embodiment.
Figure 22:
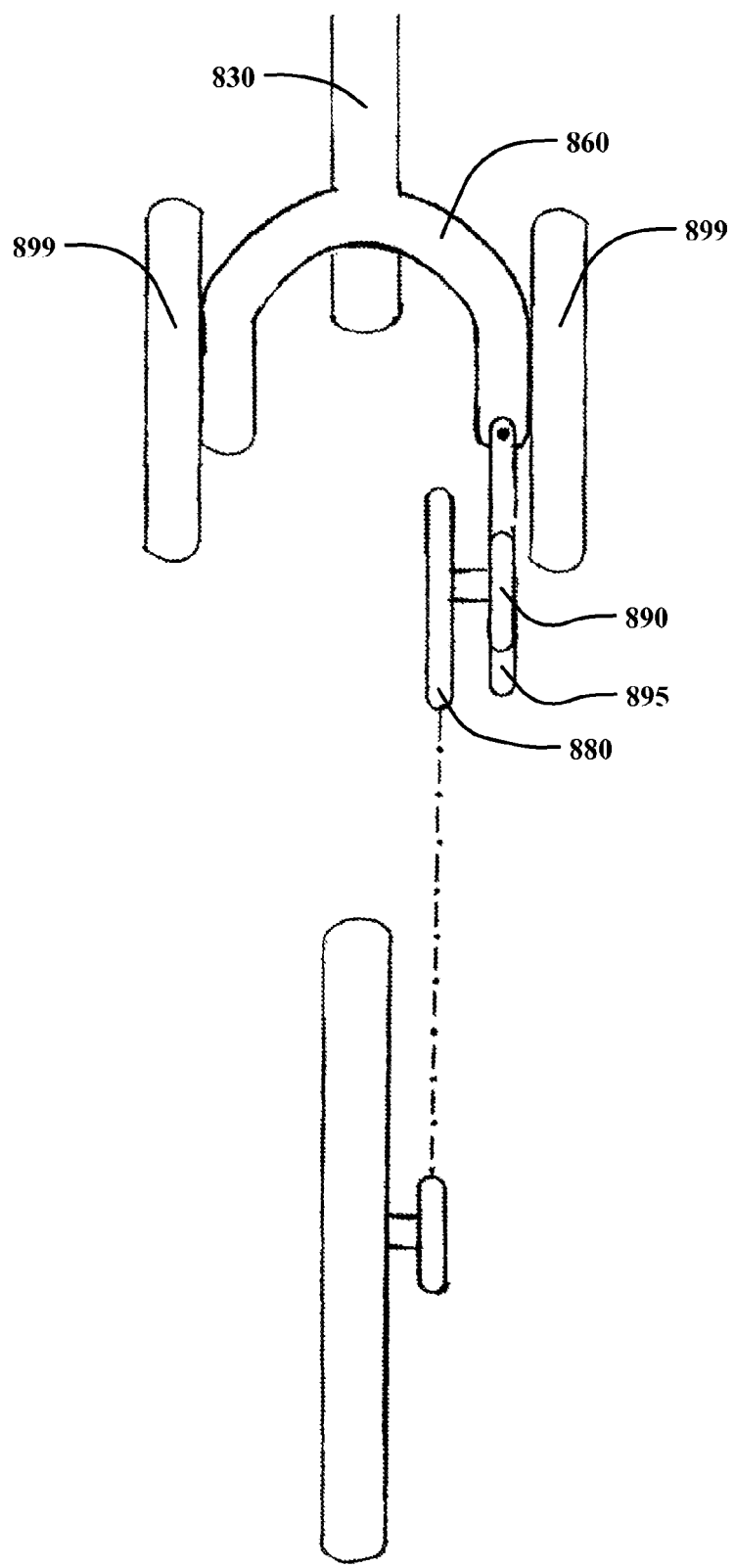
FIG. 22 is a schematic diagram of the rowing assembly of the bicycle depicted in FIG. 21 in accordance with one embodiment.

FIG. 21 depicts another embodiment of a row propelled bicycle. The propulsion system of bicycle 800 is similar to the embodiment depicted in FIG. 1. The rear-wheel drive system can be the same or similar to that described with respect to the embodiment shown in FIG. 1. The rowing mechanism 830 still utilizes the unique L shape, and the fulcrum for the rowing mechanism 830 is at the top of the steering column 990. The main differences are that power is propagated through a toothed bar 895 in what can be described as a rack and pinion system, the foot rests 899 can be used along with the rowing mechanism 830 to generate force, and the seat 999 is stationary for additional leverage.

As shown in FIG. 21, the teeth 891 of the tooth bar 895 (the rack) engages the teeth 892 of the sprocket 890 (the pinion). The toothed bar 895 is pivotally connected at its distal end to the distal end 862 of the drive lever 860. The proximal end of the toothed bar 895 is pivotally connected to a distal end of a foot rest 899, which is attached to the rowing mechanism 830 at the L shaped corner. Thus, during the rowing cycle, when the rider pulls the rowing mechanism 830 during the pulling phase, the toothed bar 895 rolls across the sprocket 890 in the forward direction. The rider can use their arm strength to pull the rowing mechanism 830, or they can push the foot rests 899 with their legs to provide additional force. It is critical to attach the foot rest 899 at the corner of the L shaped corner, or a lower point on the drive lever 860, as this provides an optimal angle to generate force. The combination of foot and hand power provides greater force to the rear wheels, while giving the user an additional muscle group to exercise. The foot rests 899 will make steering the bicycle 800 easier, as the rider could simply use their feet or hands to turn the bicycle 800.

The sprocket 890 is coaxially mounted with a main sprocket 880 and has a driving relation with the main sprocket 880 through an intermediary of a first one-way clutch 991. When the first sprocket 890 is revolving in a clockwise direction, the first sprocket 890 engages the main sprocket 880 and propels the bicycle forward. Thus, when the rider is in the pulling phase, the bicycle is propelled forward by the action of the drive lever 860.

During the rowing cycle, when the rider pushes the rowing mechanism 830 during the pushing phase, the toothed bar 895 rolls across the first sprocket 890 in a backward direction. The first sprocket 890 would not engage the main sprocket 880, and thus there is no transmission of power from the first sprocket 890 to the main sprocket 880 during the pushing phase.

Figure 23:
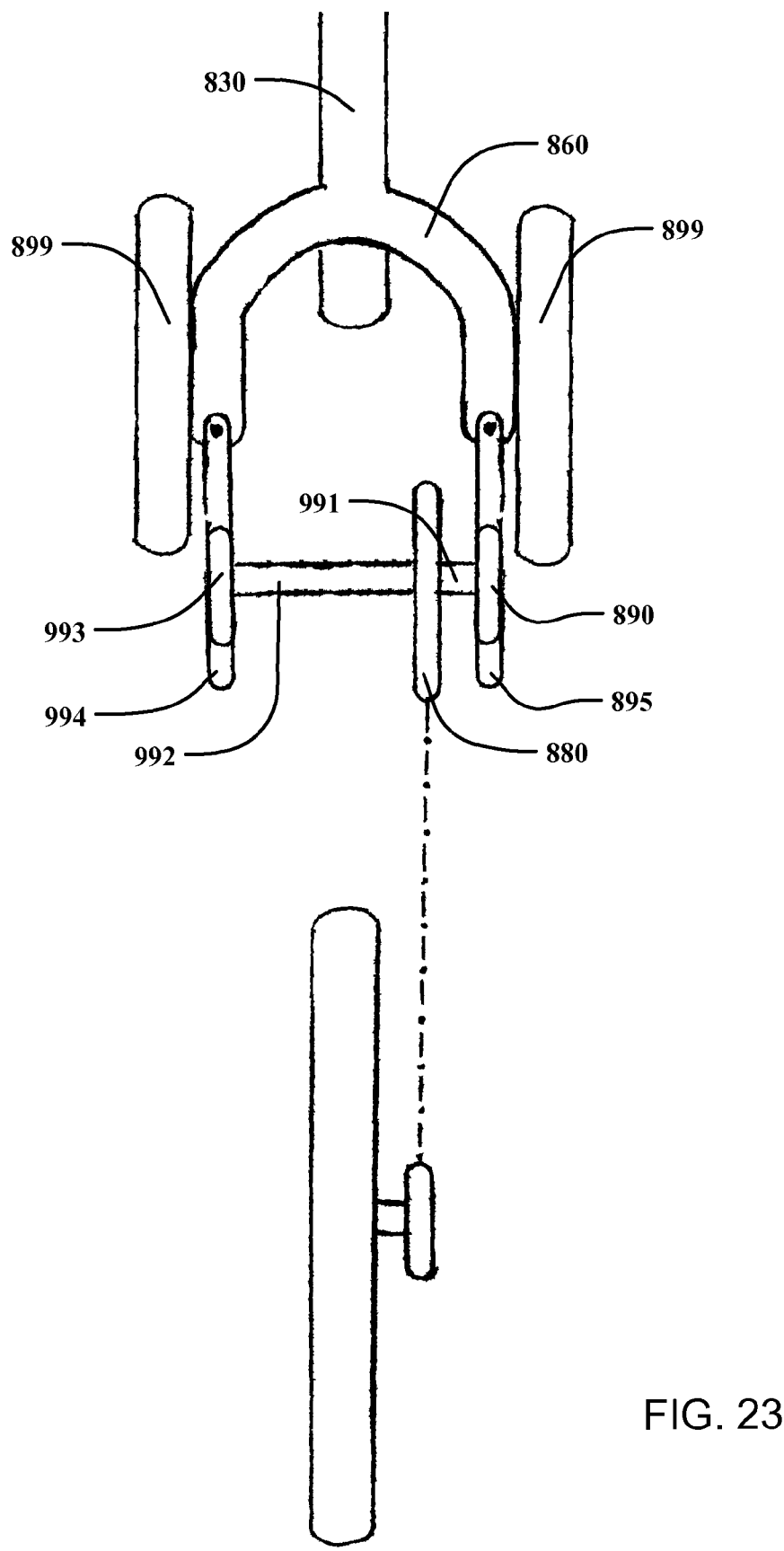
FIG. 23 is a schematic diagram of the rowing assembly of the bicycle depicted in FIG. 21 in accordance with an alternative embodiment.

In an alternative embodiment, FIG. 23 depicts a drive lever 860 moving a second toothed bar 994 so that it rolls across the second sprocket 993 in the forward direction. The second sprocket 993 is coaxially mounted with the main sprocket 880 and has a driving relation with the main sprocket 880 through an intermediary of a second one-way clutch 992, just like the first sprocket 890. When the second sprocket 993 is revolving in a clockwise direction, the second sprocket 993 engages the main sprocket 880 and propels the bicycle 800 forward. Thus, when the rider is in the pushing phase, the bicycle is propelled forward by the action of the drive lever 860. During the rowing cycle, when the rider pulls the rowing mechanism 830 during the pulling phase, the second toothed bar 994 rolls across the second sprocket 993 in a backward direction. The second sprocket 993 is not engaged to the main sprocket 880, and thus there is no transmission of power from the second sprocket 993 to the main sprocket 880 during the pulling phase. Additionally, foot straps (not shown) can be incorporated to allow the rider's feet to assist in the push phase.

The embodiments described herein can be made of any material, including titanium, steel, and aluminum. In one embodiment, the propulsion system components are made of cast carbon steel.

In addition to the above description, any manner of standard of non-standard gearing may be incorporated into the bicycles disclosed herein. These are not described in detail for the reason that they are of standard construction of the type used with geared bicycles, such as road bicycles and mountain bicycles.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

What is claimed is:
1. A standard-sized bicycle, comprising:
   a main frame;
   a stationary seat attached to the main frame for supporting a rider of the bicycle;
   a front wheel steerably mounted to a steering column attached to the main frame;
   a rear drive wheel rotatably mounted to the main frame; and
   a rowing mechanism coupled to the steering column about a fulcrum, said rowing mechanism adapted to oscillate forward about said fulcrum in response to a pushing force and backward about said fulcrum in response to a pulling force, said rowing mechanism further comprising:
   a power lever with a handle on one end and having an 'L' curve with a second end below the 'L' curve; and
   a drive lever extending from the second end of the power lever, the drive lever being in mechanical communication with the rear drive wheel such that a backward oscillation of the rowing mechanism will engage the rear drive wheel and propel the bicycle forward, wherein said drive lever comprises:
   a foot rest attached at the 'L' curve of the power lever; and
   a toothed bar attached to said drive lever.

2. The standard-sized bicycle of claim 1, further comprising:
a first sprocket;
a main sprocket coaxially mounted with said first sprocket;
a first one-way clutch that engages the first sprocket to the main sprocket; and
a main conveyor that transmits power from the main sprocket to the rear drive wheel.

3. The standard-sized bicycle of claim 2, wherein:
said drive lever is in mechanical communication with the rear drive wheel such that both a forward oscillation of the rowing mechanism and said backward oscillation of the rowing mechanism engage the rear drive wheel in a same forward direction of rotation to propel the bicycle forward.

4. The standard-sized bicycle of claim 3, further comprising:
a second sprocket;
a second one-way clutch that engages the second sprocket to the main sprocket; and
a second toothed bar;
wherein said second toothed bar engages said second sprocket during said forward oscillation of the rowing mechanism such that the second toothed bar rolls across the second sprocket, thereby transmitting force to the main sprocket through the second one-way clutch.

5. The standard-sized bicycle of claim 2 wherein:
said toothed bar engages with said first sprocket during said backward oscillation of the rowing mechanism such that the toothed bar rolls across the first sprocket, thereby transmitting force to the main sprocket through the first one-way clutch.

6. The standard-sized bicycle of claim 1, further comprising:
said foot rest being attached below the L curve of the power lever.

* * * * *